US009639336B2

(12) United States Patent
Grover et al.

(10) Patent No.: US 9,639,336 B2
(45) Date of Patent: May 2, 2017

(54) ALGORITHM FOR VECTORIZATION AND MEMORY COALESCING DURING COMPILING

(71) Applicant: NVIDIA Corporation, Santa Clara, CA (US)

(72) Inventors: Vinod Grover, Mercer Island, WA (US); Manjunath Kudlur, San Jose, CA (US); Michael Murphy, Newark, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 13/660,986

(22) Filed: Oct. 25, 2012

(65) Prior Publication Data

US 2013/0117548 A1    May 9, 2013

Related U.S. Application Data

(60) Provisional application No. 61/556,782, filed on Nov. 7, 2011.

(51) Int. Cl.
*G06F 9/44* (2006.01)
*G06F 9/45* (2006.01)
*G06F 9/50* (2006.01)

(52) U.S. Cl.
CPC ............. *G06F 8/443* (2013.01); *G06F 8/41* (2013.01); *G06F 8/433* (2013.01); *G06F 8/45* (2013.01); *G06F 8/456* (2013.01); *G06F 9/5066* (2013.01); *G06F 8/445* (2013.01); *G06F 8/4442* (2013.01)

(58) Field of Classification Search
CPC .......... G06F 8/314; G06F 8/45; G06F 8/4452; G06F 8/443; G06F 8/433; G06F 8/445; G06F 8/452; G06F 8/4442
See application file for complete search history.

(56) References Cited

U.S. PATENT DOCUMENTS

| 5,903,761 | A   |   | 5/1999 | Tyma |
| 6,401,187 | B1  | * | 6/2002 | Motokawa ............ G06F 8/4442 711/138 |
| 7,353,243 | B2  | * | 4/2008 | Scheuermann et al. ...... 708/319 |
| 7,386,842 | B2  | * | 6/2008 | Eichenberger et al. ...... 717/150 |

(Continued)

OTHER PUBLICATIONS

Yang et al., "A Unified Optimizing Compiler Framework for Different GPGPU Architectures", ACM, Jun. 2012, vol. 9, No. 2, Article 9, pp. 9:1-9:33; <http://dl.acm.org/citation.cfm?id=2207225>.*

(Continued)

*Primary Examiner* — Thuy Dao
*Assistant Examiner* — Ben C Wang
(74) *Attorney, Agent, or Firm* — Artegis Law Group, LLP

(57) ABSTRACT

One embodiment of the present invention sets forth a technique for reducing the number of assembly instructions included in a computer program. The technique involves receiving a directed acyclic graph (DAG) that includes a plurality of nodes, where each node includes an assembly instruction of the computer program, hierarchically parsing the plurality of nodes to identify at least two assembly instructions that are vectorizable and can be replaced by a single vectorized assembly instruction, and replacing the at least two assembly instructions with the single vectorized assembly instruction.

21 Claims, 11 Drawing Sheets

(56) References Cited

U.S. PATENT DOCUMENTS

| | | | |
|---|---|---|---|
| 7,548,238 B2* | 6/2009 | Berteig et al. | 345/426 |
| 7,802,076 B2* | 9/2010 | Almog | G06F 9/3808 |
| | | | 712/205 |
| 8,677,312 B1* | 3/2014 | Braun et al. | 717/106 |
| 8,689,202 B1* | 4/2014 | Braun et al. | 717/161 |
| 2002/0038453 A1 | 3/2002 | Riddle et al. | |
| 2002/0129340 A1 | 9/2002 | Tuttle | |
| 2002/0144101 A1 | 10/2002 | Wang et al. | |
| 2004/0199907 A1* | 10/2004 | Motokawa | G06F 8/4442 |
| | | | 717/140 |
| 2005/0108499 A1* | 5/2005 | Huang et al. | 711/217 |
| 2005/0289529 A1* | 12/2005 | Almog | G06F 9/3808 |
| | | | 717/158 |
| 2006/0225061 A1* | 10/2006 | Ludwig et al. | 717/161 |
| 2007/0094646 A1* | 4/2007 | Higham | G06F 8/44 |
| | | | 717/136 |
| 2008/0250401 A1* | 10/2008 | Puri | G06F 8/433 |
| | | | 717/160 |
| 2009/0150647 A1 | 6/2009 | Mejdrich et al. | |
| 2009/0222791 A1 | 9/2009 | Togawa | |
| 2009/0307656 A1* | 12/2009 | Eichenberger et al. | 717/110 |
| 2011/0010347 A1* | 1/2011 | Cheriton et al. | 707/692 |
| 2011/0296114 A1* | 12/2011 | Farrell et al. | 711/145 |
| 2012/0072391 A1* | 3/2012 | Simitsis | G06Q 10/103 |
| | | | 707/602 |
| 2012/0254845 A1* | 10/2012 | Yi | G06F 8/45 |
| | | | 717/144 |
| 2014/0082330 A1* | 3/2014 | Larin | G06F 8/445 |
| | | | 712/214 |
| 2015/0120699 A1* | 4/2015 | Faerber | G06F 17/30433 |
| | | | 707/718 |
| 2015/0154270 A1* | 6/2015 | Marinoiu | G06F 17/30572 |
| | | | 707/602 |
| 2015/0286472 A1* | 10/2015 | Lim et al. | 717/159 |
| 2016/0125111 A1* | 5/2016 | Yu | G06F 17/504 |
| | | | 716/106 |
| 2016/0291942 A1* | 10/2016 | Hutchison | G06F 8/451 |

OTHER PUBLICATIONS

Yang et al., "The Implementation of a High Performance GPGPU Compiler", Springer, Nov. 2012, pp. 768-781; <http://link.springer.com/article/10.1007/s10766-012-0228-3>.*

Xu et al., "Exploiting Hyper-Loop Parallelism in Vectorization to Improve Memory Performance on CUDA GPGPU", IEEE, Aug. 2015, pp. 53-60; <http://ieeexplore.ieee.org/stamp/stamp.jsp?tp=&arnumber=7345628>.*

International Search Report for Application No. PCT/US12/63723US dated Jan. 22, 2013.

Liou, et al. "A New Heuristic for Scheduling Parallel Programs on Multiprocessor" in Proceedings of the 1998 International Conference on Parallel Architectures and Compliation Techniques, Oct. 12-18, 1998, 358-365 [online], [retrieved on Jan. 3, 2013.

* cited by examiner

ALGORITHM FOR VECTORIZATION AND MEMORY COALESCING DURING COMPILING

CROSS-REFERENCE TO RELATED APPLICATIONS

This application claims priority to United States provisional patent application titled, "METHODS FOR OPTIMIZING GPU MEMORY ALLOCATION AND PROCESSING" filed on Nov. 7, 2011 and having Ser. No. 61/556,782. The entire content of the foregoing application is hereby incorporated herein by reference.

BACKGROUND OF THE INVENTION

Field of the Invention

The present invention generally relates to computer processing, and, more specifically, to an algorithm for vectorization and memory coalescing during compiling.

Description of the Related Art

Developers use compilers to generate executable programs from high-level source code. Typically, a compiler is configured to receive high-level source code of a program (e.g., written in C++ or Java), determine a target hardware platform on which the program will execute (e.g., an x86 processor), and then translate the high-level source code into assembly-level code that can be executed on the target hardware platform. This configuration provides the benefit of enabling the developers to write a single high-level source code program and then target that program for execution across a variety of hardware platforms, such as mobile devices, personal computers, or servers.

In general, a compiler includes three components: a front-end, a middle-end, and a back-end. The front-end is configured to ensure that the high-level source code satisfies programming language syntax and semantics, whereupon the front-end unit generates a first intermediate representation (IR) of the high-level source code. The middle-end is configured to receive and optimize the first IR, which usually involves, for example, removing unreachable code, if any, included in the first IR. After optimizing the first IR, the middle-end generates a second IR for the back-end to process. In particular, the back-end receives the second IR and translates the second IR into assembly-level code.

The assembly-level code includes low-level assembly instructions that are directly-executable on a processor that is part of the target hardware platform. As is well-understood, the number of instructions included in the generated assembly-level code may, in fact, be significantly larger than the number of instructions included in the high-level source code. For example, the simple high-level source code instruction "x=y+z" would likely be compiled into a series of assembly instructions that would include instructions for loading values for y and z into registers of a memory subsystem included in the target hardware platform, executing an addition of the values stored in the registers, and storing the sum of the values into another register. Although the processor is able to execute each of these assembly instructions at a rapid pace, the assembly instructions may reference the same or a similar area of memory, which, as set forth below in an example, introduces execution redundancies and/or inefficiencies within the target hardware platform.

Consider, for example, first, second, third and fourth assembly instructions that cause the processor to interface with the memory subsystem and read data stored in first, second, third and fourth adjacent segments, respectively, of a memory location. Consider also that a single assembly instruction—referred to herein as a "vectorized" assembly instruction—can be used in place of the first, second, third and fourth instructions. In particular, such a single vectorized assembly instruction, when executed, would exploit an available large-bandwidth memory operation that would cause the processor to simultaneously read the data stored in the first, second, third and fourth segments, respectively, of the memory location, thereby reducing the number of processor cycles required to execute the assembly instructions by a factor of four. Unfortunately, conventional compilers do not include the logic to identify these redundancies and effect code replacements.

Accordingly, what is needed in the art is a technique for generating more efficient assembly code.

SUMMARY OF THE INVENTION

One embodiment of the present invention sets forth a method for reducing the number of assembly instructions included in a computer program. The method includes the steps of receiving a directed acyclic graph (DAG) that includes a plurality of nodes, where each node includes an assembly instruction of the computer program, hierarchically parsing the plurality of nodes to identify at least two assembly instructions that are vectorizable and can be replaced by a single vectorized assembly instruction, and replacing the at least two assembly instructions with the single vectorized assembly instruction.

One advantage of the disclosed embodiments is that a compiler automatically identifies assembly instructions of a computer program that can be simplified through vectorization. In particular, the compiler replaces the identified assembly instructions with a vectorized assembly instruction, thereby reducing the number of cycles required for the processor to execute the program. Moreover, the bandwidth between the processor and the memory subsystem may, as a result, be utilized more efficiently, and effect reduced energy consumption and increased bandwidth availability to other entities that are accessing the memory subsystem.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
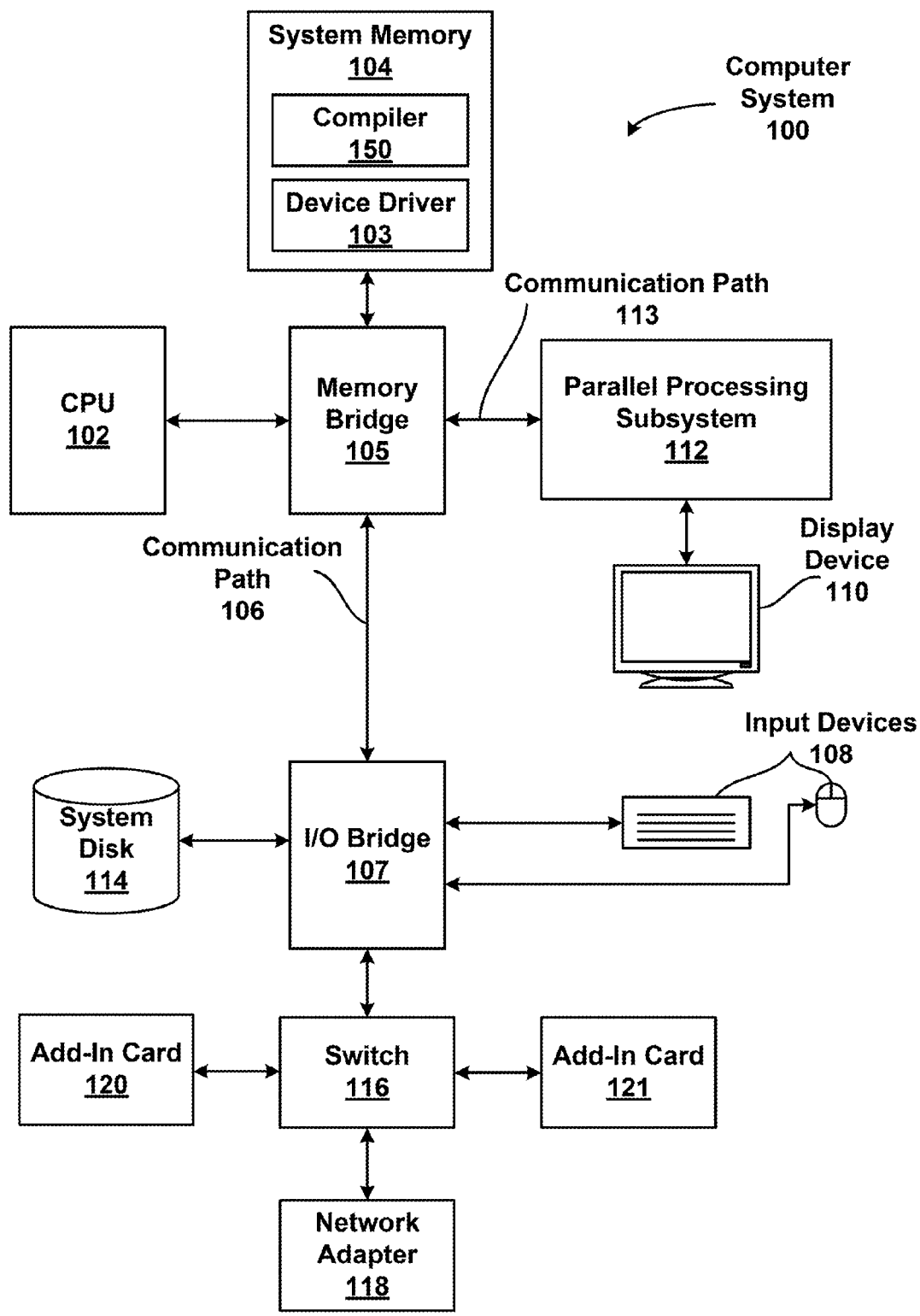
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

In one embodiment, parallel processing subsystem 112 includes one or more parallel processing units (PPUs), each of which is coupled to a local parallel processing (PP) memory. In general, parallel processing subsystem 112 includes a number U of PPUs, where U>=1. In some embodiments, some or all of the PPUs in the parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with the local parallel processing memory 113 (which can be used as graphics memory including, e.g., a conventional frame buffer) to store and update pixel data, delivering pixel data to display device 110, and the like. In some embodiments, the parallel processing subsystem 112 may include one or more PPUs that operate as graphics processors and one or more other PPUs that are used for general-purpose computations. The PPUs may be identical or different, and each PPU may have a dedicated parallel processing memory device(s) or no dedicated parallel processing memory device(s).

It will be appreciated that the system of FIG. 1 is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Vectorization and Memory Coalescing in Compiling

Figure 3A:
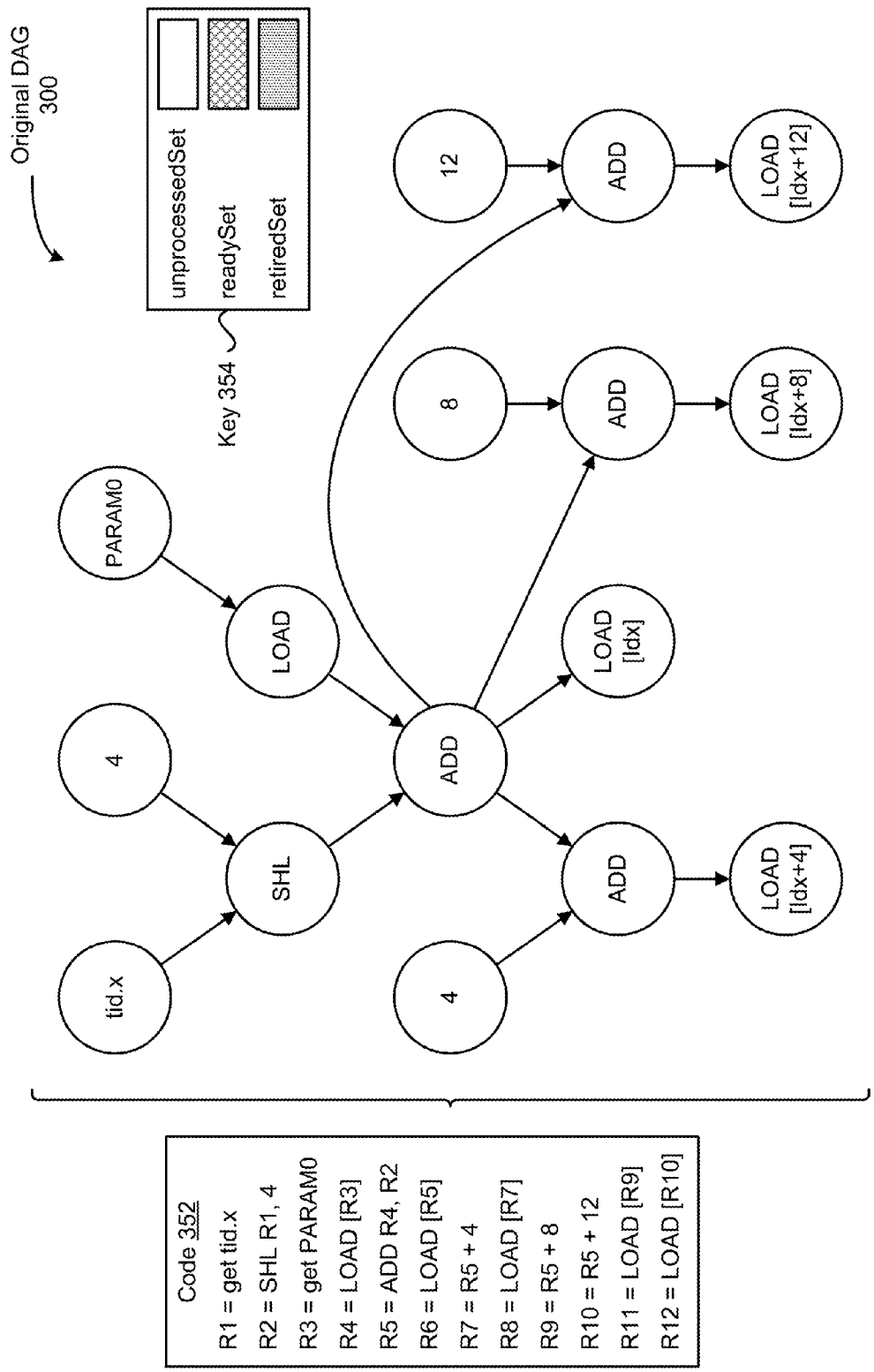
FIGS. 3A-3H illustrate how the method steps of FIGS. 2A-2B are applied to an example directed acyclic graph (DAG), according to one embodiment of the present invention.

As set forth in greater detail herein, the present invention involves a compiler 150 executing on the computer system 100 of FIG. 1 that is configured to implement an algorithm to simplify assembly instructions that make up a particular computer program. Specifically, the compiler 150 is configured to receive a directed acyclic graph (DAG) of nodes that store the assembly instructions. Each of the nodes in the DAG is connected to one another node in the DAG through various directed edges that represent dependencies between the assembly instructions stored in the nodes. For purposes of illustration only, an example set of assembly instructions is illustrated in FIG. 3A as code 352, and an example of a DAG that represents those assembly instructions and the dependencies among the instructions is illustrated in FIG. 3A as original DAG 300. As noted above, the compiler 150 processes the received DAG to identify assembly instructions that can be reduced into simpler, more efficient instructions. A detailed description of the manner in which the compiler 150 processes the DAG follows.

Figure 2A:
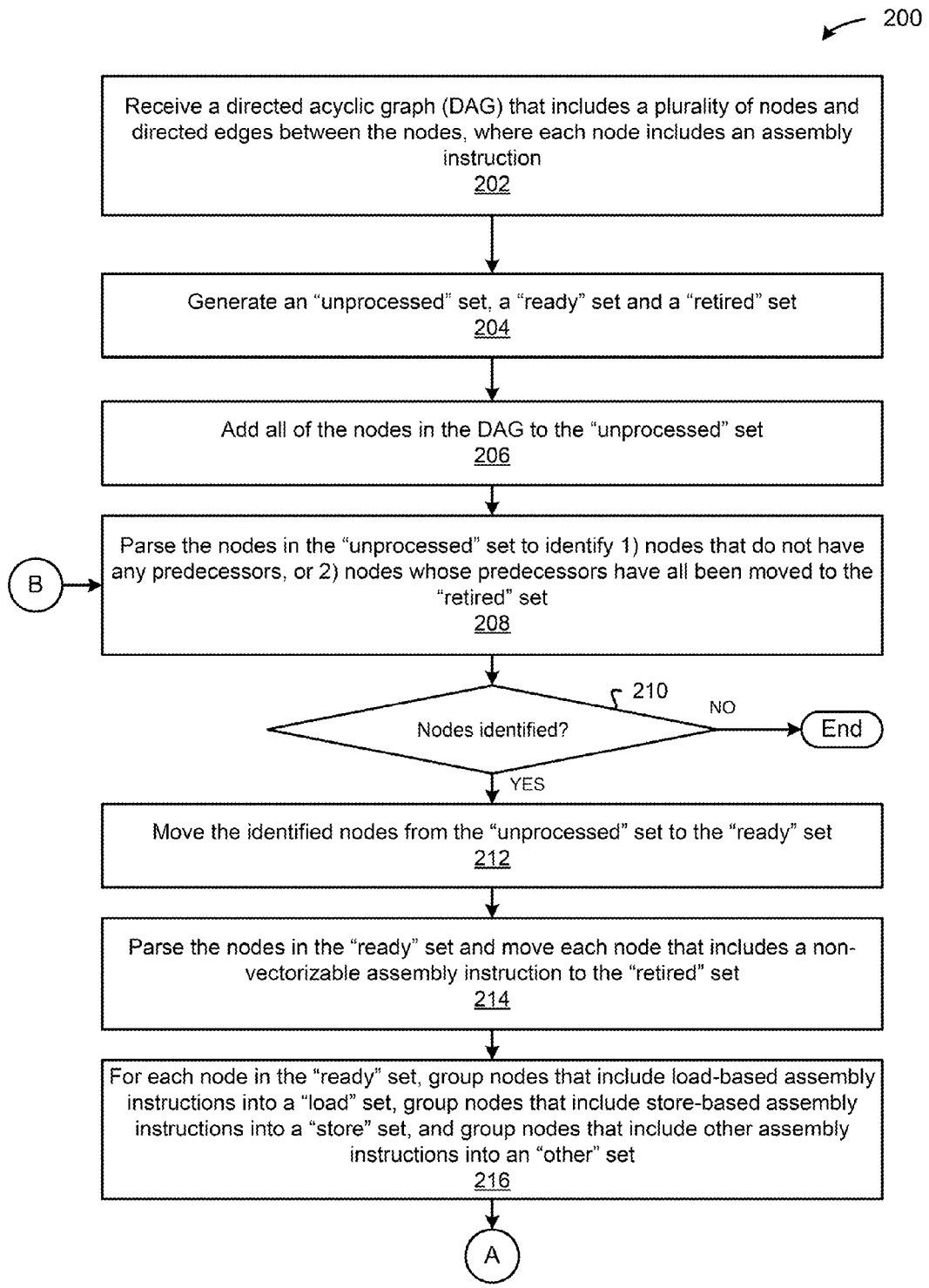
FIGS. 2A-2B illustrate a flow diagram of method steps for generating a more efficient set of assembly instructions for execution, according to one embodiment of the present invention.
Figure 2B:
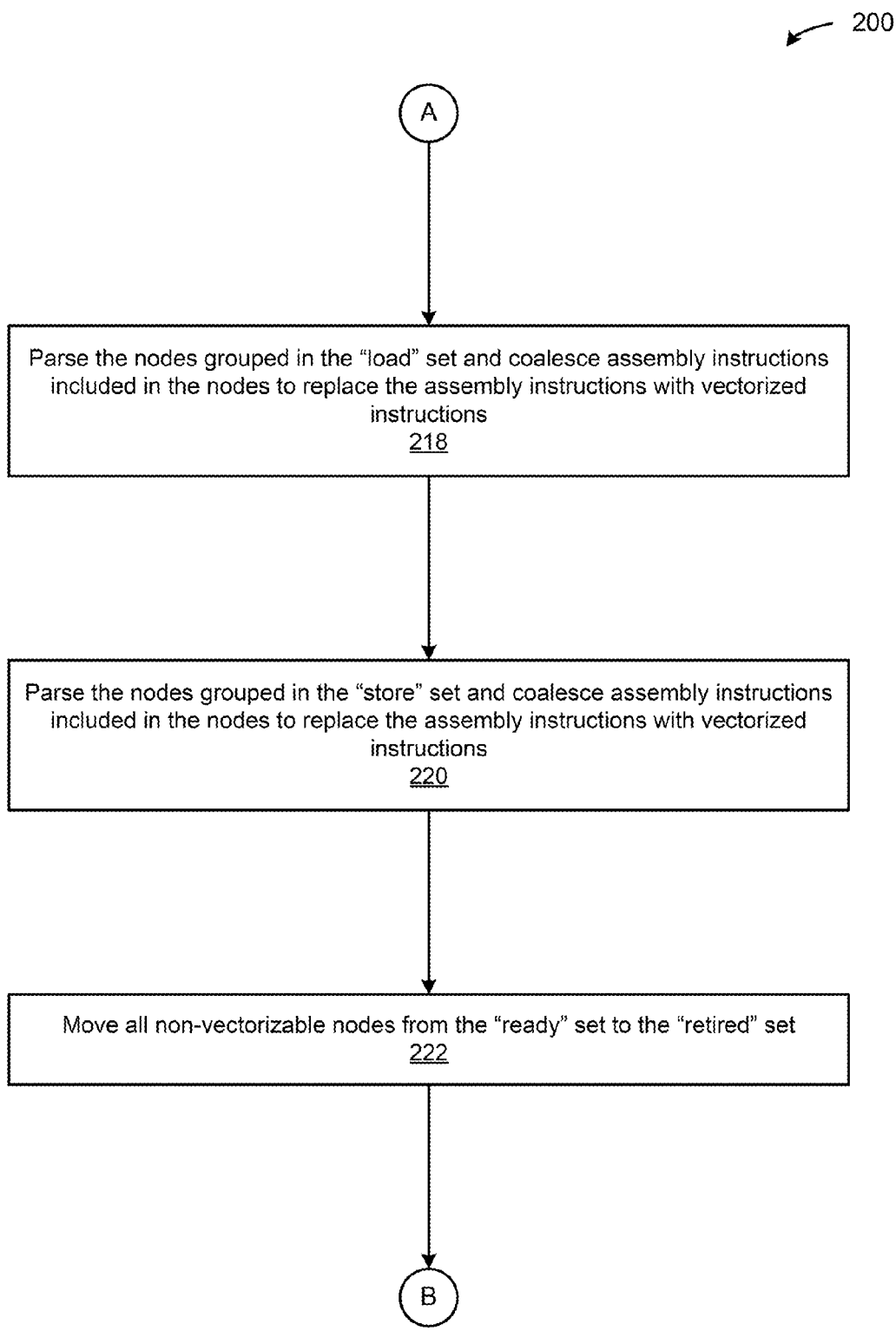

FIGS. 2A-2B illustrate FIGS. 2A-2B illustrate a flow diagram of method steps for generating a more efficient set of assembly instructions for execution, according to one embodiment of the present invention. Although the method steps are described in conjunction with the systems of FIG. 1, persons of ordinary skill in the art will understand that any system configured to perform the method steps, in any order, is within the scope of the inventions.

As shown, method 200 begins at step 202, where the compiler 150 receives a directed acyclic graph (DAG) that includes a plurality of nodes and directed edges between the nodes, where each node includes an assembly instruction. As illustrated in FIG. 3A, each node is associated with at least one directed edge that points to a different node to represent a dependency that the assembly instruction of the node has on the assembly instruction of the different node. Again, an example of a DAG is illustrated as the original DAG 300 in FIG. 3A, as well as various dependencies between the assembly instructions of code 352 (from which the original DAG 300 is derived), which are represented by the directional edges between the nodes.

At step 204, the compiler 150 generates an "unprocessed" set, a "ready" set and a "retired" set. Each of these sets is configured to temporarily store nodes of the DAG. At step 206, the compiler 150 adds all of the nodes in the DAG to the "unprocessed" set. In this manner, the "unprocessed" set is initialized to include all of the assembly instructions of the received DAG, whereupon the compiler 150 begins parsing the "unprocessed" set to identify assembly instructions that are deemed to be independent according to the criteria of step 208, described below.

At step 208, the compiler 150 parses the nodes in the "unprocessed" set to identify 1) nodes that do not have any predecessors, or 2) nodes whose predecessors have all been moved to the "retired" set. With respect to 1), the compiler 150 parses each node to identify nodes that have only outgoing edges, e.g., the nodes "tid.x", "4", "PARAM0", "4", "8" and "12" illustrated in FIG. 3A. Notably, during the first pass of step 208, the "retired" set does not yet include any nodes, so only 1) nodes that do not have any predecessors are identified.

At step 210, the compiler 150 determines whether any nodes are identified according to the criteria of step 208. If, at step 210 the compiler 150 determines that nodes are identified according to the criteria of step 208, then the method 200 proceeds to step 212, described below. Otherwise, the method 200 ends since there are no assembly instructions that can be reduced according to the techniques described herein.

Figure 3B:
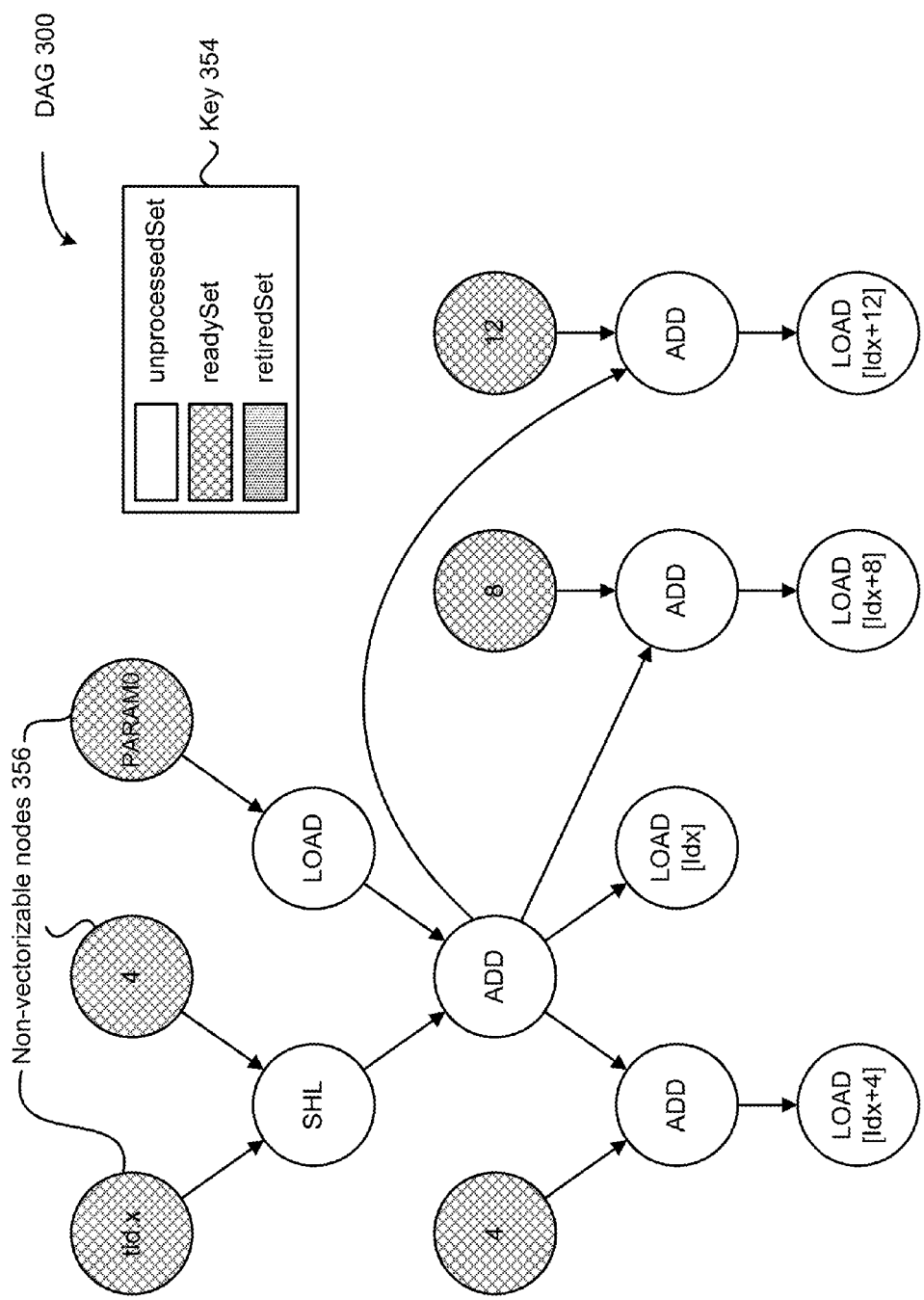

At step 212, the compiler 150 moves the nodes identified at step 208 from the "unprocessed" set to the "ready" set. An example of this movement is illustrated between FIGS. 3A and 3B, which involves moving three different nodes from the "unprocessed" set to the "ready" set. At step 214, the compiler 150 parses the nodes in the "ready" set and moves each node that includes a non-vectorizable assembly instruction to the "retired" set. FIG. 3B illustrates various nodes that include non-vectorizable assembly instructions as non-vectorizable nodes 356.

At step 216, the compiler 150, for each node in the "ready" set, groups nodes that include load-based assembly instructions into a "load" set, and groups nodes that include store-based assembly instructions into a "store" set.

At step 218, the compiler 150 parses the nodes grouped in the "load" set and coalesces assembly instructions included in the nodes to replace the assembly instructions with vectorized assembly instructions. According to one embodiment, the compiler 150 is configured to vectorize the assembly instructions by identifying assembly instructions that load memory addresses that are adjacent to one another. For simplicity, the following technique describes a scenario where only two assembly instructions are identified and reference adjacent memory addresses; however, one having skill in the art will recognize that embodiments of the invention are scalable to account for vectorizing a larger number of assembly instructions.

In one embodiment, the compiler 150 identifies that two assembly instructions can be combined into one vectorized assembly instruction if 1) the memory address referenced by the first assembly instruction is of the form "[a]"— and the first assembly instruction loads "n" bytes of data, 2) the memory address referenced by the second assembly instruction is of the form "[a+n]", and 3) "a" is aligned at "2*n". If these criteria are satisfied, then the compiler 150 replaces the first assembly instruction and the second assembly instruction with a vectorized assembly instruction that, when executed, cause both the memory address [a] and [a+n] to be simultaneously loaded with the data specified in the first assembly instruction and the second assembly instruction, respectively. An example of vectorizing assembly instructions is illustrated between FIGS. 3F and 3G. In particular, in FIG. 3F, four nodes reference different assembly load instructions that can be vectorized into a single, vectorized assembly load instruction. Accordingly, in FIG. 3G, the four separate load commands are replaced with a single, vectorized assembly instruction ("VLD4[Idx]").

At step 220, the compiler 150 parses the nodes grouped in the "store" set and coalesces assembly instructions included in the nodes to replace the assembly instructions with vectorized instructions. Step 220 is carried out by the compiler 150 according to the same techniques described above with respect to step 218. However, since step 220 is directed to assembly instructions that store data, any vectorized instructions that are used to replace assembly instructions cause the memory addresses specified by the replaced assembly instructions to be simultaneously read.

At step 222, the compiler 150 moves all non-vectorizable nodes in the "ready" set to the "retired" set, whereupon the method 200 returns to step 208. At this point, nodes may have been added into the "retired" set, which may cause new nodes in the "unprocessed" set to be identified under the criteria 2) of step 208. For example, in FIG. 3B, all of the predecessors of the assembly instructions "SHL" and "LOAD" have been added to the "retired" set, so "SHL" and "LOAD" are identified under the criteria 2) of step 208.

Accordingly, method steps 208-222 are executed until all of the nodes in the "unprocessed" set have been moved into the "retired" set. As a result, the nodes in the retired set may set forth a simplified DAG of nodes whose assembly instructions execute more efficiently than the assembly instructions of the nodes included in the DAG received at step 202.

FIGS. 3A-3H illustrate an execution of the method 200 of FIGS. 2A-2B on the original DAG 300 of FIG. 3A, according to one embodiment of the present invention. Again, the original DAG 300 is based on the instructions included in code 352, where the directed edges between the assembly instructions (i.e., nodes) represents dependencies between the assembly instructions. As shown in FIG. 3A, all of the nodes of the original DAG 300 are added to the "unprocessed" set according to step 206 of FIG. 2A, which is captured by the key 354.

Figure 3C:
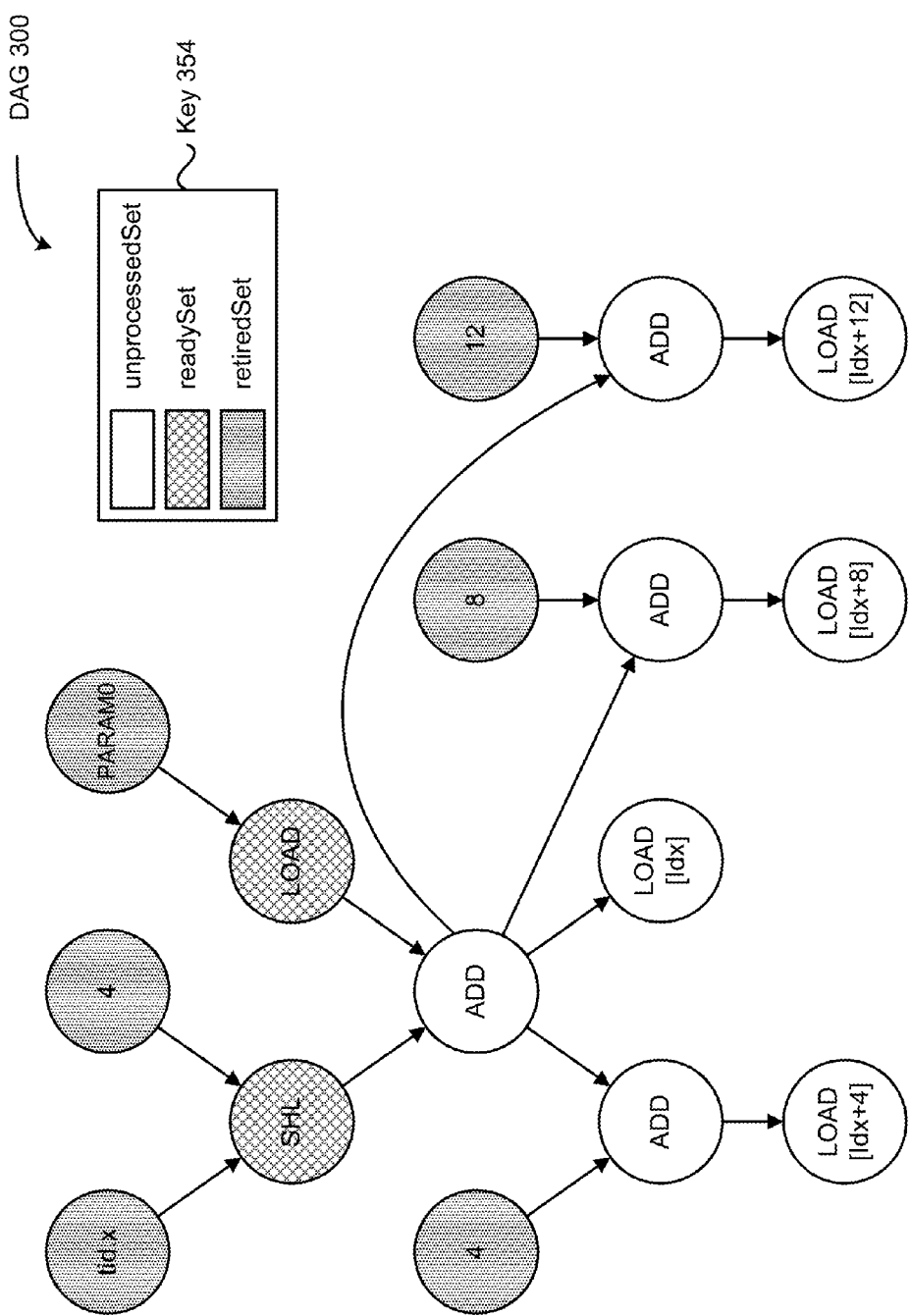
Figure 3D:
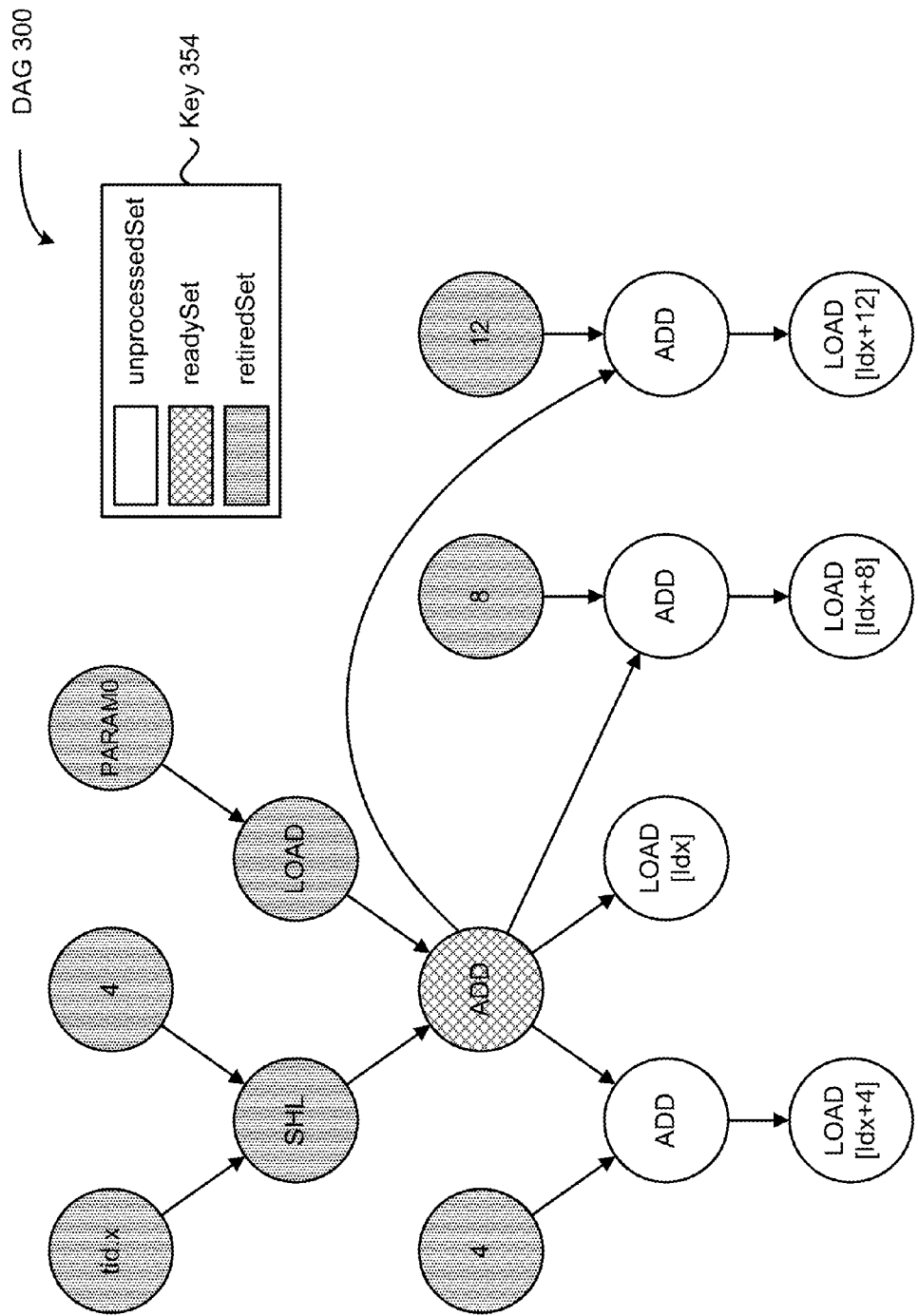
Figure 3E:
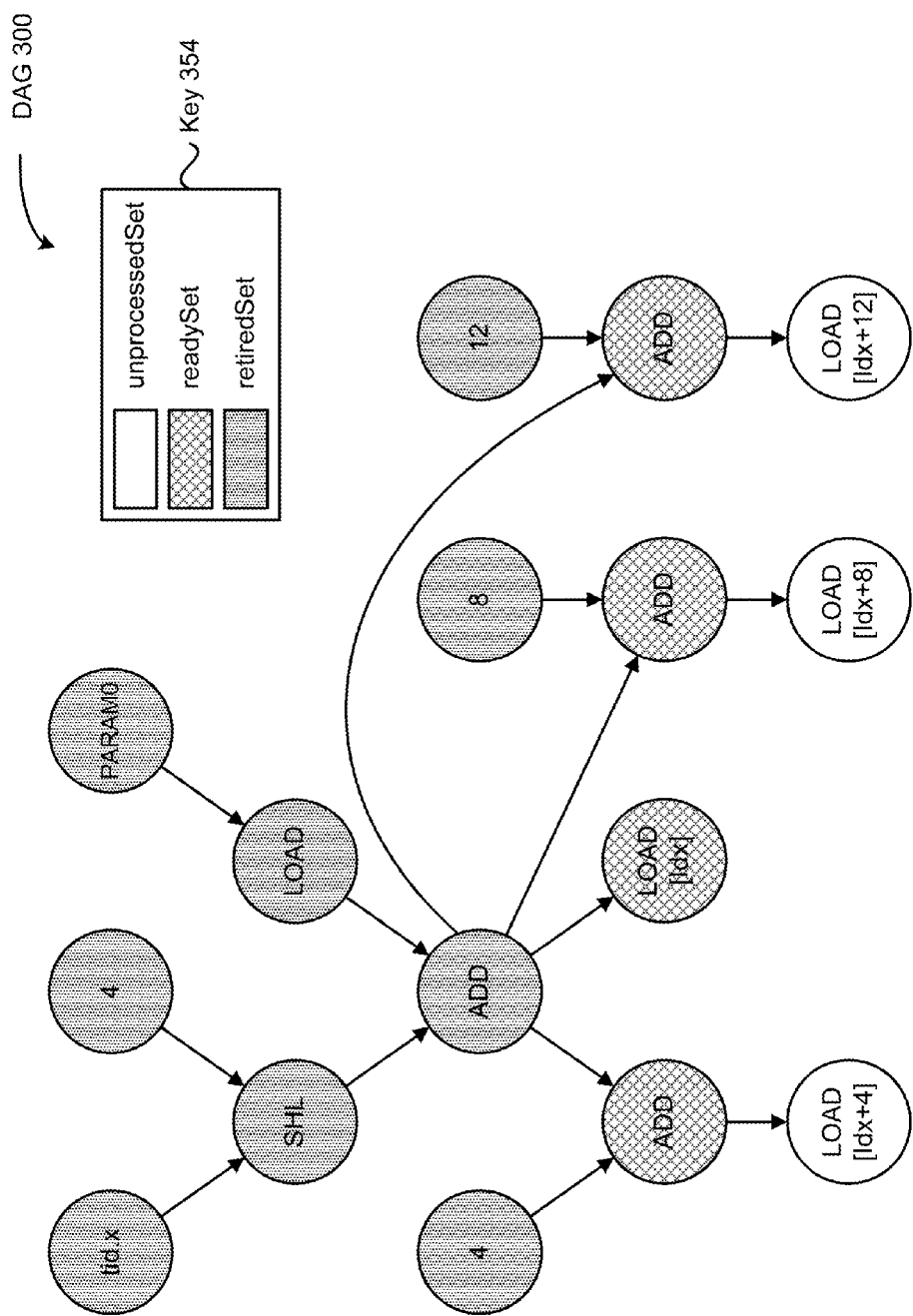
Figure 3F:
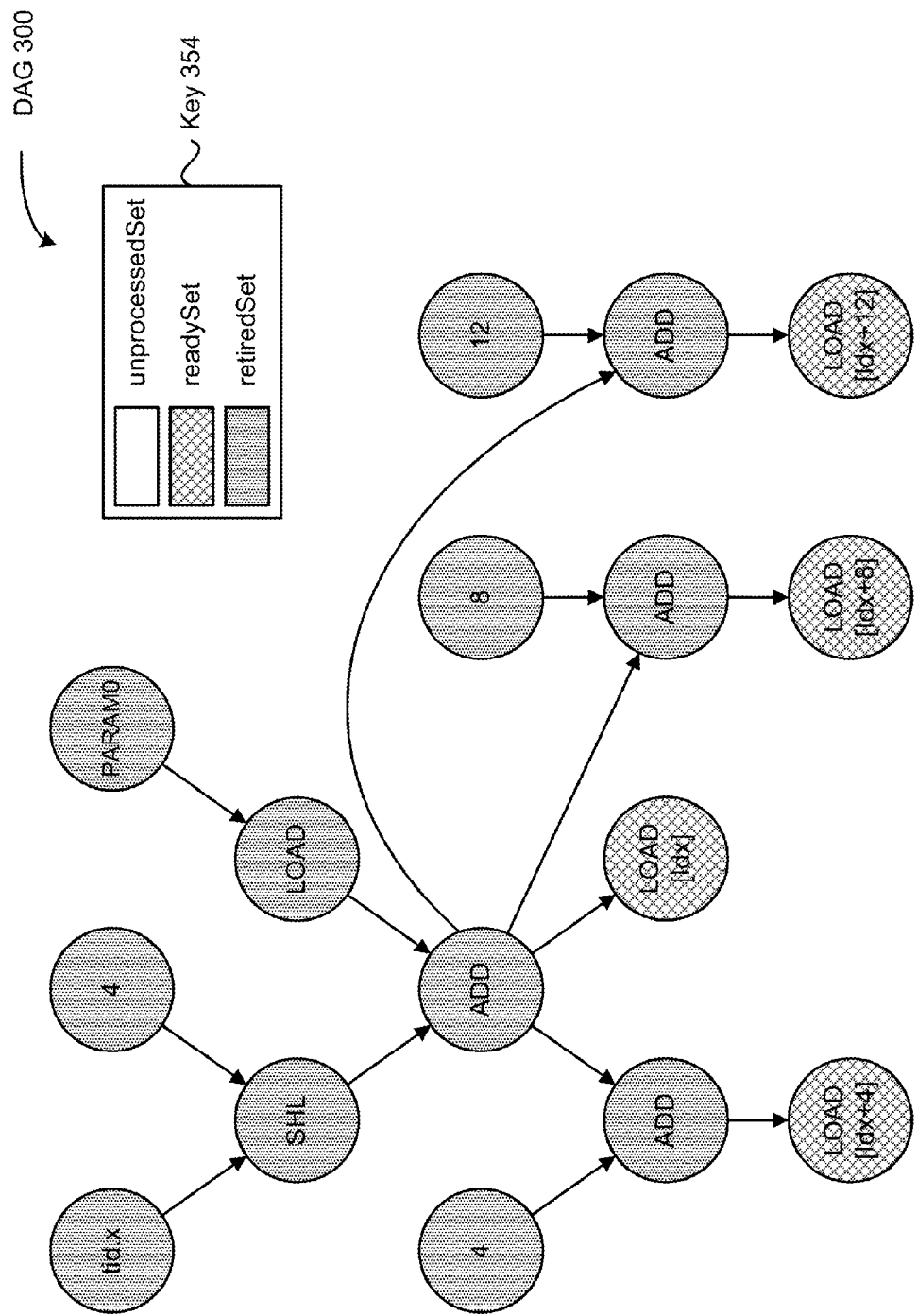

FIG. 3B illustrates a first pass of the method steps 208-222, where six assembly instructions are identified according to the criteria of step 208. None of the six identified assembly instructions are vectorizable, so they are added to the retired set, as illustrated in FIG. 3C. Also shown in FIG. 3C are the next two assembly instructions that are identified by a second pass of the method steps 208-222: "SHL" and "LOAD". Again, neither of these assembly instructions is vectorizable, so they are added to the "retired"

set, as illustrated in FIG. 3D. Also shown in FIG. 3D is the next assembly instruction that is identified by a third pass of the method steps 208-222: "ADD". Again, this assembly instruction is not vectorizable, so the assembly instruction is added to the "retired" set, as illustrated in FIG. 3E. Also shown in FIG. 3E are the next four assembly instructions that are identified by a fourth pass of the method steps 208-222: "ADD", "LOAD [Idx]", "ADD", and "ADD". Of these four assembly instructions, the "LOAD [Idx]" assembly instruction is vectorizable, so the assembly instruction is not moved to the "retired" set. However, the three "ADD" assembly instructions are not vectorizable, so they are moved to the "retired" set. Such movements are illustrated in FIG. 3F.

Figure 3G:
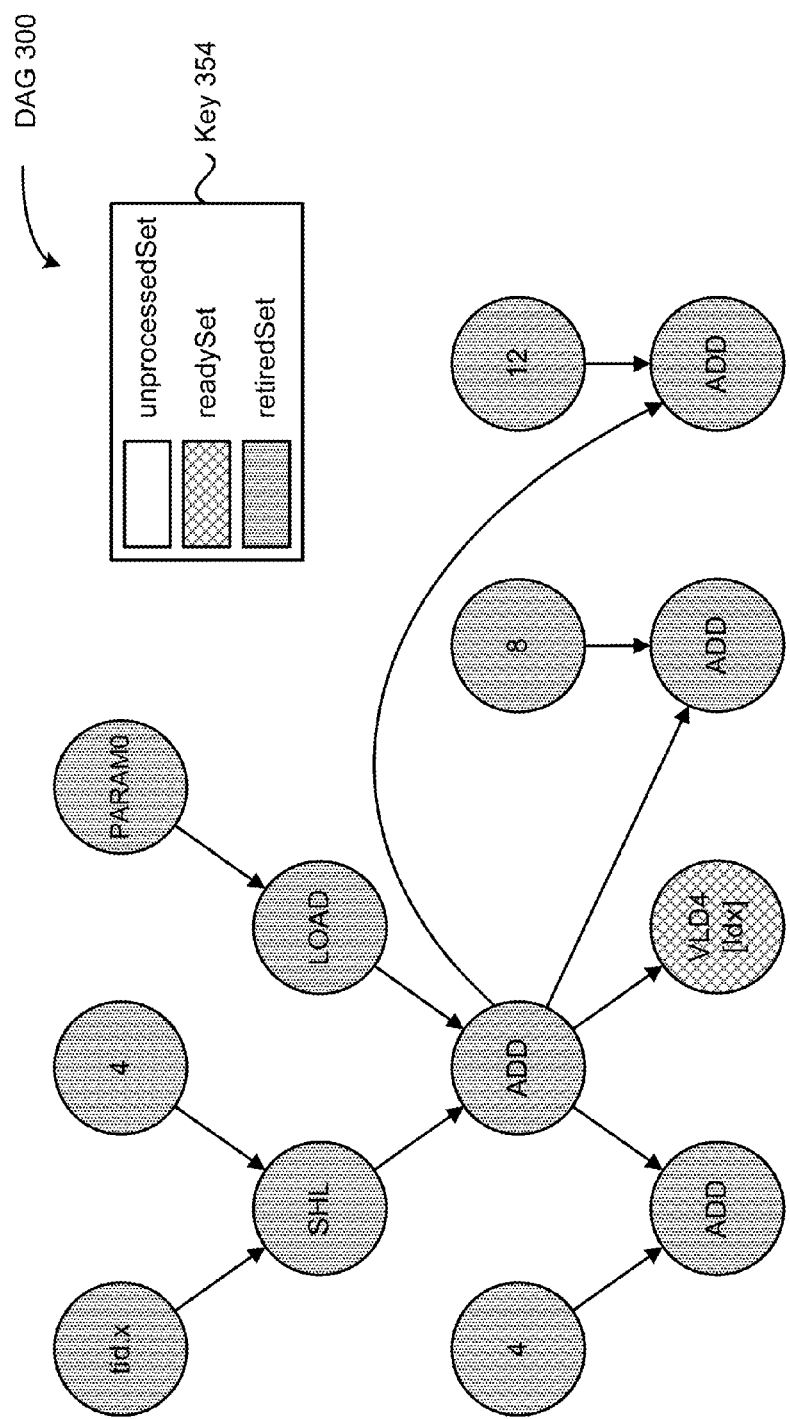
Figure 3H:
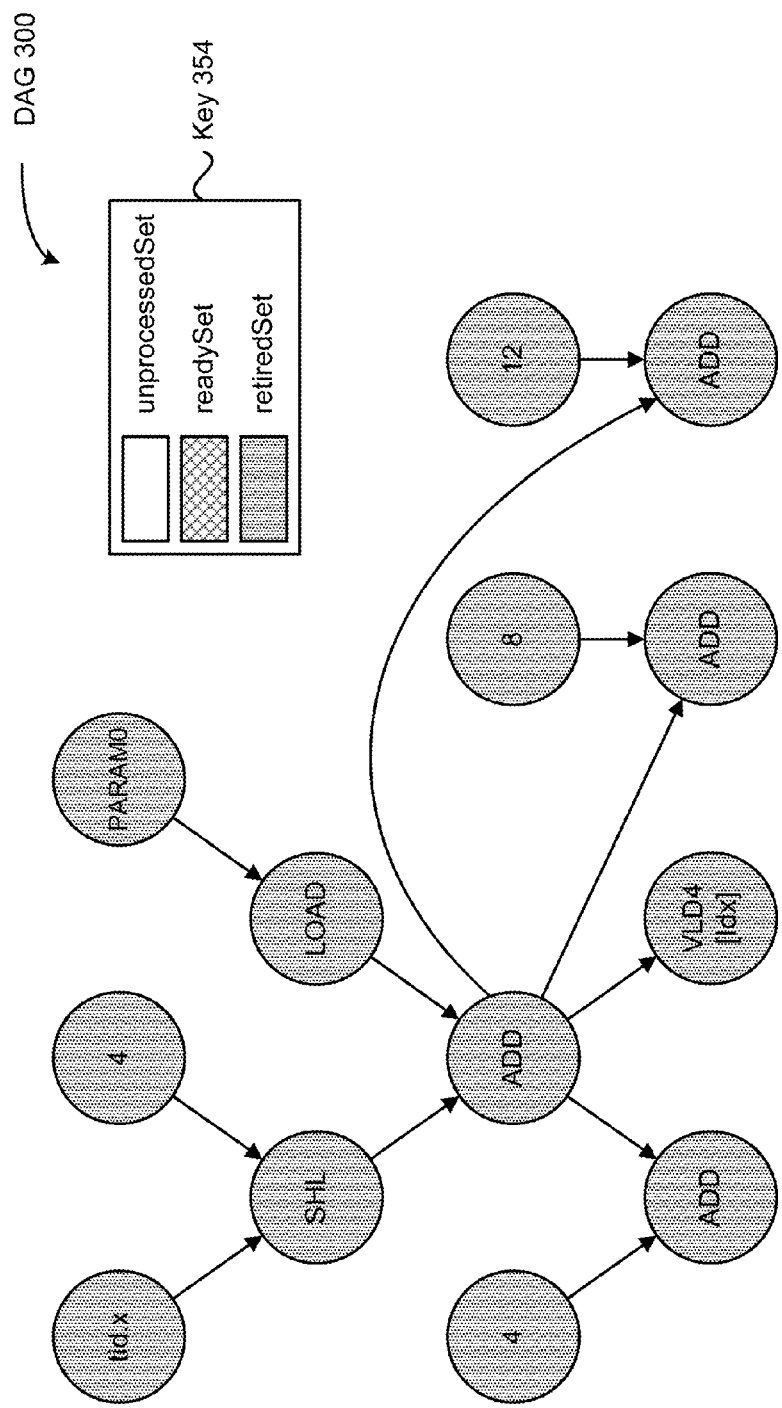

Upon a fifth pass of the method steps 208-222, the compiler 150 identifies three assembly instructions that are vectorizable: "LOAD [Idx+4]", "LOAD [Idx+8]", "LOAD [Idx+12]". Thus, according to step 218, these assembly instructions—along with the "LOAD [Idx]" assembly instruction that remains in the "ready" set, are replaced with a single vectorized assembly instruction, which is illustrated in FIG. 3G as "VLD4[Idx]." Finally, the assembly instruction "VLD[Idx]" is added to the "retired" set, as illustrated in FIG. 3H. Thus, the number of assembly instructions included in the original DAG 300 is reduced by three, which increases overall efficiency of the code 352.

In sum, embodiments of the invention set forth a technique for reducing the number of assembly instructions included in a computer program. The compiler 150 receives a directed acyclic graph (DAG) that includes a plurality of nodes, where each node is connected to at least one other node by a directed edge and includes assembly instruction of the computer program. The nodes are moved from an "unprocessed" set, to a "ready" set, and then to a "retired" set. In particular, nodes in the "unprocessed" set that do not have any predecessors—or nodes in the "unprocessed" set whose predecessors have all been moved to the "retired" set—are identified and are moved into the "ready" set. The compiler 150 then processes the nodes in the "ready" set and replaces vectorizable assembly instructions with one or more vectorized assembly instructions. The nodes are then moved to the "retired" set, whereupon the foregoing technique is repeated until all of the nodes have been processed and have been moved into the "retired" set.

One advantage of the techniques disclosed herein is that compiled assembly instructions are automatically checked by the compiler 150 for additional optimization opportunities. Specifically, the compiler 150 is able to detect vectorizable assembly instructions that can be replaced with fewer or simpler vectorized assembly instructions. In this manner, the total number of instructions of which the computer program is comprised may potentially be reduced, which increases overall execution efficiency of the computer program. Moreover, fewer or more efficient assembly instructions results in fewer cycles of any processor tasked to execute the computer program, which directly correlates to energy savings.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A processor-implemented method for reducing the number of assembly instructions included in a computer program, comprising:
   receiving a directed acyclic graph (DAG) that includes a plurality of nodes, wherein each node includes an assembly instruction of the computer program;
   identifying nodes from within a first set that includes the plurality of nodes and that is deemed to be an unprocessed set that do not have any predecessors;
   moving the identified nodes into a second set;
   grouping the nodes included in the second set into different groups of nodes based on a type of assembly instruction included in each node;
   for a first group of nodes included in the different groups of nodes, identifying at least two assembly instructions corresponding to two or more nodes included in the first group of nodes that are vectorizable and can be replaced by a first single vectorized assembly instruction;
   for a second group of nodes included in the different groups of nodes, identifying at least two assembly instructions corresponding to two or more nodes in the second group of nodes that are vectorizable and can be replaced by a second single vectorized assembly instruction;
   replacing the at least two assembly instructions associated with the first group of nodes with the first single vectorized assembly instruction; and
   replacing the at least two assembly instructions associated with the second group of nodes with the second single vectorized assembly instruction.

2. The processor-implemented method of claim 1, further comprising:
   identifying additional nodes from within the first set that are deemed to be an unprocessed set that are nodes whose predecessors have been moved from the second set deemed to be a ready set into a third set deemed to be a retired set;
   moving the additional nodes into the second set;
   copying the plurality of nodes into the first set of nodes; and
   moving all nodes from the second set to the third set that do not include a vectorizable assembly instruction.

3. The processor-implemented method of claim 2, wherein replacing the at least two assembly instructions further comprises moving the at least two nodes from the second set of nodes to the third set of nodes.

4. The processor-implemented method of claim 2, wherein removing all nodes from the second set of nodes that do not include a vectorizable assembly instruction comprises moving some but not all of the nodes from the second set of nodes to the third set of nodes.

5. The processor-implemented method of claim 2, further comprising grouping the at least two nodes into a load memory operation group or a store memory operation group.

6. The processor-implemented method of claim 1, wherein identifying that the at least two assembly instructions are vectorizable comprises:
   identifying a first assembly instruction associated with the at least two assembly instructions that references n-bytes of data stored at a first memory address;
   identifying a second assembly instruction associated with the at least two assembly instructions that references a second memory address that is offset from the first memory address by n-bytes; and
   determining that the first memory address begins at a value equal to two times n-bytes of data.

7. The processor-implemented method of claim 6, wherein the vectorized assembly instruction, when executed, causes the first memory address and the second memory address to be referenced substantially simultaneously.

8. The processor-implemented method of claim 6, wherein the first memory address and the second memory address are referenced by writing a first value into the first memory address and writing a second value into the second memory address.

9. The processor-implemented method of claim 6, wherein the first memory address and the second memory address are referenced by reading a first value from the first memory address and reading a second value from the second memory address.

10. The processor-implemented method of claim 1, wherein the first group of nodes includes memory load assembly instructions, and the second group of nodes includes memory store instructions.

11. A non-transitory computer-readable storage medium storing instructions that, when executed by a processor, cause the processor to reduce the number of assembly instructions included in a computer program, by performing the steps of:
   receiving a directed acyclic graph (DAG) that includes a plurality of nodes, wherein each node includes an assembly instruction of the computer program;
   identifying nodes from within a first set that includes the plurality of nodes and that is deemed to be an unprocessed set that either do not have any predecessors or that are nodes whose predecessors have been moved from a second set deemed to be a ready set into a third set deemed to be a retired set;
   moving the identified nodes into the second set;
   identifying at least two assembly instructions corresponding to two or more nodes in the second set that are vectorizable and can be replaced by a single vectorized assembly instruction;
   replacing the at least two assembly instructions with the single vectorized assembly instruction;
   and
   moving all nodes from the second set to the third set that do not include a vectorizable assembly instruction.

12. The non-transitory computer-readable storage medium of claim 11, wherein replacing the at least two assembly instructions further comprises moving the at least two nodes from the second set of nodes to the third set of nodes.

13. The non-transitory computer-readable storage medium of claim 11, wherein removing all nodes from the second set of nodes that do not include a vectorizable assembly instruction comprises moving some but not all of the nodes from the second set of nodes to the third set of nodes.

14. The non-transitory computer-readable storage medium of claim 11, further comprising grouping the at least two nodes into a load memory operation group or a store memory operation group.

15. A non-transitory computer-readable storage medium storing instructions that, when executed by a processor, cause the processor to reduce the number of assembly instructions included in a computer program, by performing the steps of:
   receiving a directed acyclic graph (DAG) that includes a plurality of nodes, wherein each node includes an assembly instruction of the computer program;
   identifying nodes from within a first set that includes the plurality of nodes and that is deemed to be an unprocessed set that do not have any predecessors;
   moving the identified nodes into a second set;
   grouping the nodes included in the second set into different groups of nodes based on a type of assembly instruction included in each node;
   for a first group of nodes included in the different groups of nodes, identifying at least two assembly instructions corresponding to two or more nodes included in the first group of nodes that are vectorizable and can be replaced by a first single vectorized assembly instruction;
   for a second group of nodes included in the different groups of nodes, identifying at least two assembly instructions corresponding to two or more nodes in the second group of nodes that are vectorizable and can be replaced by a second single vectorized assembly instruction;
   replacing the at least two assembly instructions associated with the first group of nodes with the first single vectorized assembly instruction; and
   replacing the at least two assembly instructions associated with the second group of nodes with the second single vectorized assembly instruction.

16. The non-transitory computer-readable storage medium of claim 15, wherein identifying that the at least two assembly instructions are vectorizable comprises:
   identifying a first assembly instruction associated with the at least two assembly instructions that references n-bytes of data stored at a first memory address;
   identifying a second assembly instruction associated with the at least two assembly instructions that references a second memory address that is offset from the first memory address by n-bytes; and
   determining that the first memory address begins at a value equal to two times n-bytes of data.

17. The non-transitory computer-readable storage medium of claim 16, wherein the vectorized assembly instruction, when executed, causes the first memory address and the second memory address to be referenced substantially simultaneously.

18. The non-transitory computer-readable storage medium of claim 16, wherein the first memory address and the second memory address are referenced by writing a first value into the first memory address and writing a second value into the second memory address.

19. The non-transitory computer-readable storage medium of claim 16, wherein the first memory address and the second memory address are referenced by reading a first value from the first memory address and reading a second value from the second memory address.

20. A system for reducing the number of assembly instructions included in a computer program, the system comprising:
a processor, configured to:
receive a directed acyclic graph (DAG) that includes a plurality of nodes, wherein each node includes an assembly instruction of the computer program;
identify nodes from within a first set that includes the plurality of nodes and that is deemed to be an unprocessed set that do not have any predecessors;
move the identified nodes into a second set;
group the nodes included in the second set into different groups of nodes based on a type of assembly instruction included in each node;
for a first group of nodes included in the different groups of nodes, identify at least two assembly instructions corresponding to two or more nodes included in the first group of nodes that are vectorizable and can be replaced by a first single vectorized assembly instruction;
for a second group of nodes included in the different groups of nodes, identify at least two assembly instructions corresponding to two or more nodes in the second group of nodes that are vectorizable and can be replaced by a second single vectorized assembly instruction;
replace the at least two assembly instructions associated with the first group of nodes with the first single vectorized assembly instruction; and
replace the at least two assembly instructions associated with the second group of nodes with the second single vectorized assembly instruction.

21. The system of claim 20, wherein the processor is further configured to:
identify additional nodes from within the first set that are deemed to be an unprocessed set that are nodes whose predecessors have been moved from the second set deemed to be a ready set into a third set deemed to be a retired set;
move the additional nodes into the second set;
copy the plurality of nodes into the first set of nodes; and
move all nodes from the second set to the third set that do not include a vectorizable assembly instruction.

* * * * *